United States Patent [19]

Johnson

[11] Patent Number: 5,273,727

[45] Date of Patent: * Dec. 28, 1993

[54] FLUE GAS PURIFICATION AND PRODUCTION OF DRY AMMONIUM BISULFITES AND BISULFATES

[75] Inventor: Arthur F. Johnson, Boulder, Colo.

[73] Assignee: Energy Conservation Partnership, Ltd., Boulder, Colo.

[*] Notice: The portion of the term of this patent subsequent to Jun. 16, 2009 has been disclaimed.

[21] Appl. No.: 730,417

[22] Filed: Jul. 16, 1991

[51] Int. Cl.[5] .................. C01B 17/00; C01B 17/20; C01B 21/00; C01C 1/24

[52] U.S. Cl. .................. 423/243.06; 423/235; 423/545; 423/519.2

[58] Field of Search .......... 423/239, 239 A, 545, 423/243.06, 235, 235 D, 512 A

[56] References Cited

U.S. PATENT DOCUMENTS

| | | | |
|---|---|---|---|
| 2,374,608 | 4/1945 | McCollum | 60/31 |
| 2,438,851 | 3/1948 | Gates | 25/76 |
| 2,893,699 | 7/1959 | Bubniak | 257/6 |
| 2,977,096 | 3/1961 | Evans | 257/67 |
| 2,981,521 | 4/1961 | Evans et al. | 257/267 |
| 3,391,727 | 7/1968 | Topouzian | 165/9 |
| 3,442,232 | 5/1969 | White | 110/18 |
| 3,456,928 | 7/1969 | Selway | 261/22 |
| 3,607,034 | 9/1971 | Henery | 423/522 |
| 3,676,059 | 7/1972 | Welty, Jr. | 423/547 |
| 3,770,385 | 11/1973 | Grey et al. | 23/260 |
| 3,839,849 | 10/1974 | Manya | 55/73 |
| 3,880,618 | 4/1975 | McCrea et al. | 423/239 |
| 4,051,225 | 9/1977 | Shiga et al. | 423/545 |
| 4,054,246 | 10/1977 | Johnson | 237/1 A |
| 4,089,088 | 5/1978 | Konczalski | 23/277 |
| 4,101,635 | 7/1978 | Nambu et al. | 423/522 |
| 4,140,175 | 2/1979 | Darm | 165/115 |
| 4,160,810 | 7/1979 | Benson et al. | 423/223 |
| 4,173,304 | 11/1979 | Johnson | 237/1 A |
| 4,235,608 | 11/1980 | Watanabe | 55/181 |
| 4,339,883 | 7/1982 | Waldmann | 34/27 |

(List continued on next page.)

FOREIGN PATENT DOCUMENTS

| | | | |
|---|---|---|---|
| 0286892 | 10/1988 | European Pat. Off. | 423/239 |
| 2744324 | 4/1979 | Fed. Rep. of Germany | 423/243.06 |
| 3541252 | 9/1986 | Fed. Rep. of Germany | |
| T035972 | 8/1985 | Hungary | |
| 48-1599 | 1/1973 | Japan | 423/243.06 |
| 55-105535 | 8/1980 | Japan | |

OTHER PUBLICATIONS

Bovier-Sulfur-Smoke Removal System, 26 Proc. Am. Power Conf. 138 (1964).

R. Kujoura, et al.-81 Bull. Tokyo Inst. of Technology 1 (1967).

Slack, et al.-Sulfur Dioxide Removal from Waste Gases 176 (1975).

Van Nostrand's Scientific Encyclopedia 1678 (3rd ed. 1958).

Chemical Rubber Handbook of Chemistry And Physics 1707 (43rd Ed. 1961).

F. Ephraim-Inorganic Chemistry 178,694 (P. Thorne & E. Roberts 4th ed. 1943).

The Manufacture of Sulphuric Acid (W. Duecker & E. Roberts 4th ed. 1943).

Unit Processes & Principle of Chemical Engineering by John C. Olson, Ph.D., D.Sc.

*Primary Examiner*—Gregory A. Heller
*Attorney, Agent, or Firm*—Pennie & Edmonds

[57] ABSTRACT

A system is provided for converting flue gas pollutants to useful dry or concentrated ammonium bisulfite and ammonium bisulfate byproducts and other harmless byproducts, and for collecting the useful byproducts. The system also removes particulate material to maximize the desired reactions, and cools the flue gas in heat exchange with boiler feedwater.

11 Claims, 3 Drawing Sheets

U.S. PATENT DOCUMENTS

| | | | |
|---|---|---|---|
| 4,383,573 | 5/1983 | Wincze | 165/7 |
| 4,409,191 | 12/1983 | Osman | 423/547 |
| 4,444,128 | 4/1984 | Monro | 110/345 |
| 4,454,410 | 6/1984 | Faatz | 423/522 |
| 4,466,815 | 8/1984 | Southam | 423/522 |
| 4,497,361 | 2/1985 | Hajicek | 165/7 |
| 4,526,112 | 7/1985 | Warner | 110/345 |
| 4,557,202 | 12/1985 | Warner | 110/216 |
| 4,582,122 | 4/1986 | Fan | 165/1 |
| 4,597,433 | 7/1986 | Johnson | 165/4 |
| 4,600,561 | 7/1986 | Frei | 422/170 |
| 4,619,671 | 10/1986 | Ruff et al. | 55/222 |
| 4,649,033 | 3/1987 | Ladeira et al. | 423/242 |
| 4,744,967 | 5/1988 | Brand et al. | 473/533 |
| 4,776,391 | 10/1988 | Warner | 165/111 |
| 4,781,797 | 11/1988 | Johnson | 202/173 |
| 4,783,326 | 11/1988 | Srednicki | 423/242 |
| 4,793,981 | 12/1988 | Doyle et al. | 423/239 |
| 4,802,897 | 2/1989 | Johnson | 55/55 |
| 4,829,911 | 5/1989 | Nielson | 110/234 |
| 4,871,522 | 10/1989 | Doyle | 423/329 |
| 4,874,585 | 10/1989 | Johnson et al. | 422/171 |
| 4,876,986 | 10/1989 | Johnson | 122/20 |
| 4,900,403 | 2/1990 | Johnson | 203/78 |
| 4,932,334 | 6/1990 | Patte et al. | 110/216 |
| 5,051,245 | 9/1991 | Wilson et al. | 423/545 |

FLUE GAS PURIFICATION AND PRODUCTION OF DRY AMMONIUM BISULFITES AND BISULFATES

FIELD OF THE INVENTION

This invention relates to a system for the removal of noxious pollutants, including compounds of sulfur and nitrogen, from boiler plant flue gases. It also relates to a system for production of ammonium bisulfite and ammonium bisulfate fertilizer products.

BACKGROUND OF THE INVENTION

Boiler plants, particularly those having coal-fired boilers, are well-known sources of pollution. Sulfur emissions from these plants has become a matter of heightened concern in recent years, in light of the perceived effects of "acid rain." Although pollutant emission reduction has long been the object of scientific inquiry, there is still a great demand for methods and apparatus that are effective, easily retrofit onto existing plants, and which convert the collected pollutants into useful and valuable byproducts.

The prior art recognizes that cooling flue gases that contain sulfur trioxide and water vapor will result in condensation of sulfuric acid. See U.S. Pat. No. 4,526,112 to Warner; U.S. Pat. No. 4,874,585 to Johnson, et al.; U.S. Pat. No. 4,910,011 to Dorr, et al; and Bovier, Sulfur-Smoke Removal System, 26 Proc. Am. Power Conf. 138 (1964). Other systems of the prior art employ high-volume sprays of water or other liquid agents to scrub particulate matter and pollutants from the flue gas. See U.S. Pat. No. 3,442,232 to White; U.S. Pat. No. 3,456,928 to Selway; and U.S. Pat. No. 3,770,385 to Grey et al.

It has further been recognized that when a tube-type heat exchanger is located in the path of a flue gas flow, the particulate material in the gas can collect on the heat exchanger tubes. Cleansing sprays have been provided in accompaniment with the heat exchangers according to some prior art methods, in order to wash the collected particulates from the heat exchangers. See U.S. Pat. No. 4,452,620 to Dosmond; and U.S. Pat. No. 4,526,112 to Warner.

Although all of the aforementioned systems are more or less effective in removing some degree of the pollutants from the flue gas, they merely shift the environmental burden from atmospheric waste to surface waste. Attempts have therefore been made to convert pollutants into useful end products as they are removed from flue gases. One such approach involves the introduction of ammonia to combine with sulfur oxides in the flue gas and form ammonium bisulfite or ammonium bisulfate. See Studies on the Recovery of Sulfur Dioxide from Hot Flue Gases to Control Air Pollution, R. Kiyoura, et al., 81 Bull. Tokyo Inst. of Tech. 1 (1967); Slack et al., Sulfur Dioxide Removal From Waste Gases 176 (1975). The combination of ammonia and sulfur oxides according to these references produced a dry ammonium bisulfite or ammonium bisulfate product. Neither of these systems has been commercially adopted, however, due to drawbacks that have until now remained unsolved. Chief among these drawbacks is the impediment to gas flow which the solid precipitate causes, especially where closely-packed heat exchanger tube arrangements are employed. In addition, the full potential of this approach for substantially complete removal of pollutants including sulfur and nitrogen from flue gas has not been realized.

It is therefore an object of the present invention to provide a system for removing pollutants from flue gas by which substantially all oxides of sulfur and nitrogen are removed.

It is a further object of the invention to provide such a system in which the harmful pollutants are not merely removed from the flue gas to be disposed elsewhere, but are converted into useful and environmentally safe substances, particularly ammonium bisulfite and ammonium bisulfate.

It is another object of the invention to provide such a system in which the formation of useful byproducts does not cause obstruction of the gas flow or hamper the proper functioning of the apparatus.

It is yet another object of the invention to provide such a system which is readily retrofit onto existing boiler plant exhaust equipment.

SUMMARY OF THE INVENTION

These and other objects of the present invention that would be apparent to one skilled in the art are provided by the present invention, which comprises a heat exchanger located along a duct carrying flue gas to exhaust, means for introducing an ammoniacal substance to the flue gas ahead of the heat exchanger, means for collecting dry ammonium bisulfite and ammonium bisulfate formed by the reaction of the ammoniacal substance with oxides of sulfur in the flue gas, means for periodically washing the heat exchanger, and means for removing particulate material from the flue gas ahead of the ammoniacal substance introducing means.

An alternative embodiment of the invention condenses and collects sulfuric acid in a first heat exchange step, oxidizes $SO_2$ and forms and collects ammonium bisulfite and bisulfate in a second heat exchange step, and further cools the flue gas to ambient temperature in a third heat exchange step.

The invention provides for the substantially complete conversion of sulfur and nitrogen pollutants to substantially pure and useful byproducts, while cooling the flue gas in heat exchange with boiler feedwater. Continuous operation with minimal maintenance is assured by means for periodically washing byproduct deposits from the heat exchanger.

DETAILED DESCRIPTION OF THE PREFERRED EMBODIMENTS

Figure 1:
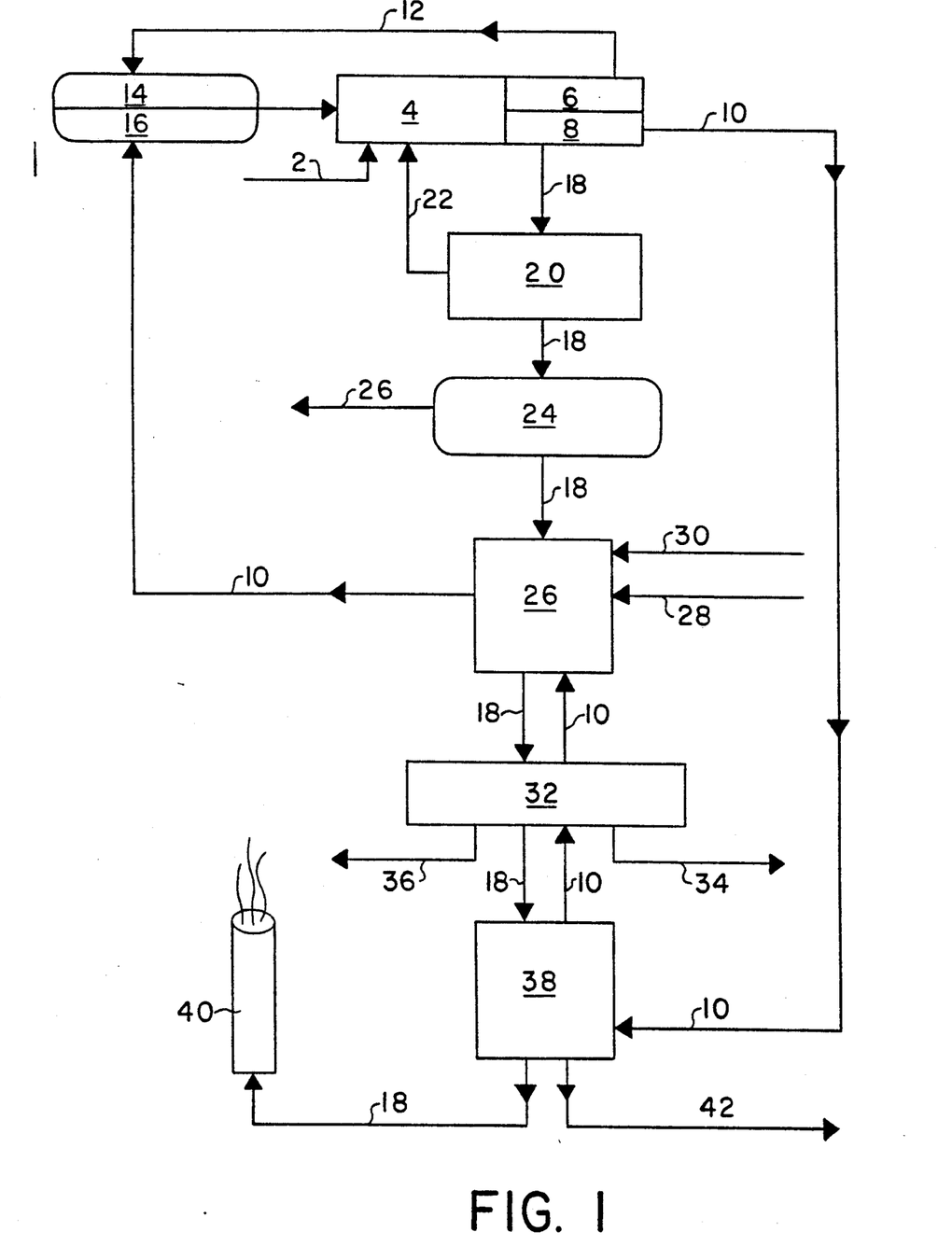
FIG. 1 is a flow chart showing the arrangement of the components of the present invention along the flows of flue gas and boiler feedwater in a typical power plant application.

The operation of the preferred embodiment of the present invention may be appreciated by reference to FIG. 1. According to this embodiment, solid ammonium bisulfite or ammonium bisulfate, useful as fertilizer, is formed by the introduction of a sufficient amount of ammonia or ammonium hydroxide into the flue gas at certain specified locations.

The flow chart of FIG. 1 shows the basic configuration of the invention within a typical power plant system. Fossil fuel 2 is supplied to a boiler 4, which produces steam. The steam drives turbines 6, and a condenser 8 then cools the steam, returning it to the boiler feedwater state. The condensed feedwater 10 exits the condenser at about 40° F. to 80° F. Some remaining wet steam 12 is used in a preheater 14 for the boiler feedwater, which is returned to the boiler via pumps 16.

Flue gas 18 leaving the boiler is first cooled from about 700° F. to about 600° F. by an air preheater 20. Preheating the boiler combustion air 22 increases the efficiency of boiler combustion.

The flue gas is next directed through a baghouse 24 to remove particulates 26, such as fly ash. This serves two purposes. First, adverse effects of particulate pollutants on the desired reactions are prevented. Second, the byproducts obtained, which in this case are themselves in particulate form, are not significantly contaminated with unwanted matter.

As a matter of chemistry, it has long been known that the presence of certain substances can retard reactions between other substances. Such a "negative catalyst" effect is pertinent here because the effectiveness of the present pollutant removal system depends on complete reactions between ammoniacal substances and flue gas pollutants, as detailed below.

Fly ash and other particulates in the flue gas contain matter that can act as a negative catalyst to the reactions sought by the present invention. One of those reactions is the oxidation of $SO_2$ in the flue gas to $SO_3$, in order to produce ammonium bisulfate rather than ammonium bisulfite as a byproduct. The reaction also consumes oxides of nitrogen, which are converted to harmless pure nitrogen.

Some of the particulates in the flue gas can inhibit these desired reactions. For example, flue gas contains phenol, which has just such a negative catalytic effect. See F. Ephraim, *Inorganic Chemistry* (4th ed. 1943). Despite the appreciation of this effect as a matter of chemistry, its impact on flue gas pollutant removal has not been satisfactorily addressed. The present invention prevents the phenomenon from inhibiting full conversion of sulfur oxides to safe and useful byproducts, by locating the baghouse 2 or similar particulate filtration means ahead of the other system components. Substantially all particulates are removed by this means.

The flue gas will likely cool to a temperature of between about 500° F. and 400° F. in the baghouse 24. After leaving baghouse 24, the flue gas enters a condensing heat exchanger 26 in which heat is exchanged between the flue gas and boiler feedwater. An ammoniacal substance 28 such as ammonia or ammonium hydroxide is introduced to the flue gas, at or before the heat exchanger 26, in an amount sufficient to combine with substantially all $SO_2$ and $SO_3$ in the flue gas and produce solids of ammonium bisulfite or ammonium bisulfate. The process occurs according to the reaction: $O_2 + 2H_2O + 4NH_3 + 2SO_2 \rightarrow 2(NH_4)_2SO_4$. This reaction, which is not reversible, produces about 22 Btu/lb. ammonium sulfate.

The tubes of heat exchanger 26 need not be coated with acid-resistant material. Unlike many prior art systems, sulfuric acid is not the product of this pollutant removal process. Nevertheless, it may be desirable to provide a protective coating (e.g., Nylon or Teflon) anyway, to guard against acid condensation resulting from inadequate provision of ammonia. A coating is also of benefit in preventing abrasion to the steel or iron pipes that would normally be used. The coating must withstand the high temperatures of flue gas, and also have satisfactory heat exchange properties.

In order to prevent plugging of the heat exchanger 26 by the solid byproducts, water 30 is periodically provided to wash off the heat exchanger tubes. Such periodic cleansing should suffice to prevent any serious difficulty with restriction of the flue gas flow or diminution in heat exchange efficiency.

The ammonium bisulfite and bisulfate solids produced in the heat exchanger 26 are collected by an electrostatic precipitator 32. The collection of dry, marketable byproducts would be compromised, however, at times when the heat exchanger is washed by water 30. Separate collecting means are provided, as described below with reference to FIG. 2, so that the solution 34 from the periodical cleansing of the exchanger 26 is collected separately from the dry byproducts 36 usually yielded.

The byproducts could be collected by other means as well. For example, a conventional baghouse could be used to collect the dry product. Alternatively, the temperature could be lowered past the dew point of water and all of the ammonium sulfates collected in a slurry.

Once the desired byproducts have been collected, the flue gas may be further cooled to a low temperature by a second heat exchanger 38. This will ordinarily be a desired feature of the invention. Heat is recovered by the boiler feedwater, which improves plant efficiency. The step also takes advantage of the purified state of the flue gas. Ordinarily, flue gas would contain more pollutants and would have to be discharged out of a high stack. A high flue gas temperature is necessary to successfully discharge gas through such stacks, however, which are often hundreds of feet in height. The purity of flue gas treated according to the present invention allows a shorter stack 40 to be used in discharging the gas. This, in turn, obviates the need to maintain the gas at an elevated temperature, so that the additional cooling and heat recovery may be exploited.

Water 42 that condenses during this second cooling step will be non-toxic, substantially all pollutants having been removed from the gas in the preceding operations. Small remaining quantities of pollutants or particulate matter may be washed out of the flue gas by the considerable amount of condensate at this stage, but the effluent would still be relatively environmentally clean.

The foregoing process is capable of removing substantially all sulfur oxides in the flue gas. Moreover, the bulk of sulfur pollutants in the form of sulfur dioxide will be oxidized to sulfur trioxide so that the most desired byproduct, ammonium bisulfate, is obtained. This oxidation occurs in part as a result of the production of nitrogen dioxide, $NO_2$, when ammonia, $NH_3$, is "burned" in the high temperature flue gas. $NO_2$, is an excellent oxidizing agent. Addition of large amounts of ammonia or ammonium hydroxide causes the further reaction that yields ammonium bisulfite or ammonium bisulfate, as described earlier. Employing ammonium hydroxide also assists in oxidizing $SO_2$ to $SO_3$. Oxidation can always be effected by the addition of other oxidizing agents as well, such as oxygen or air.

This embodiment of the invention is easily retrofit to existing power plants and is capable of removing substantially all sulfur oxide pollutants from the flue gas stream. The stack gas released after treatment with the invention has about the following composition: 71–77%

$N_2$, 13-18% $CO_2$, 3-6% $O_2$, and 5-7% $H_2O$. This is advantageously close to the make-up of the atmosphere, which is roughly 80% nitrogen, 20% oxygen and 0.03% $CO_2$. Emissions are therefore environmentally sound.

Figure 2:
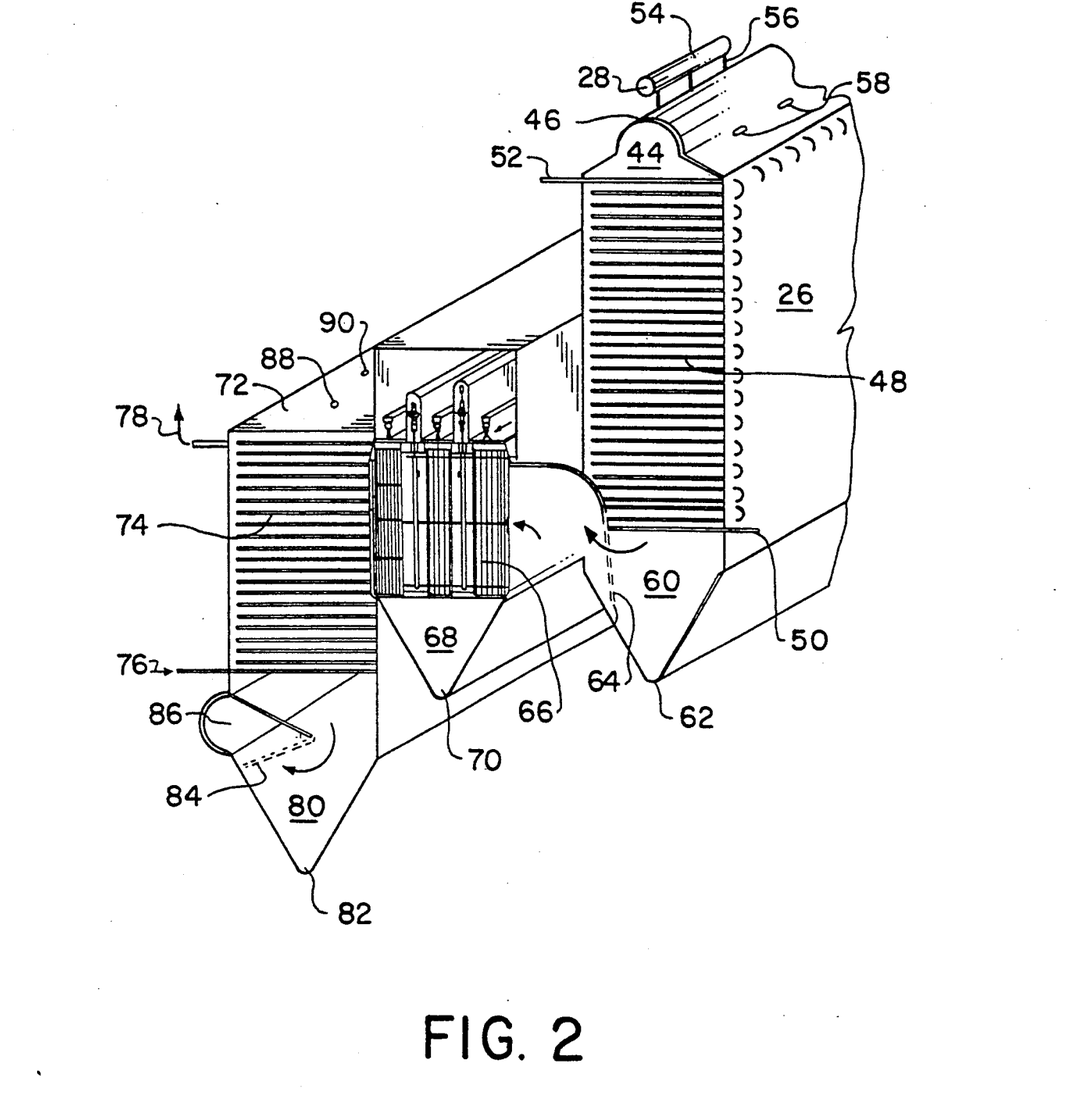
FIG. 2 is a cut-away view of the invention of FIG. 1 from the first heat exchanger to the second heat exchanger.

The primary pollutant removal components of the embodiment depicted in FIG. 1. are shown in greater detail in FIG. 2. The boiler plant flue gas, having been cleaned of fly ash and other particulates by a conventional bag house, enters the top of the first heat exchanger 26 via a space 44 between the roof 46 of the heat exchanger and a great multiplicity of boiler feed tubes 48. The tubes 48 receive warm boiler feedwater at an inlet 50 at a temperature of about 200° F. to 240° F., and raise the temperature of the water by heat exchange with the flue gas to a temperature of about 380° F. to 450° F. The heated water exits at an outlet 52 for delivery to boiler plant pumps as indicated in FIG. 1. The heat exchange process cools the flue gas from between about 400° F. and 500° F. to a temperature of about 230° F. Induced draft fans (not shown) can be used, if necessary, to maintain the flow of flue gas.

A duct 54 is located along the top of the first heat exchanger, and a plurality of downpipes 56 connect the duct 54 to the heat exchanger 26. An ammoniacal substance 28, preferably ammonia hydroxide, is fed through the duct 54 and downpipes 56 into the first heat exchanger 26 in precisely regulated amounts to produce solid ammonium sulfate crystals according to following reaction:

$$O_2 + 2H_2O + 4NH_3 + 2SO_2 \rightarrow 2(NH_4)_2SO_4$$

These solid crystals are formed directly from the combination of the sulfur compounds in the flue gas and the ammoniacal substance that itself becomes vaporized upon introduction to the hot gas.

Formation of a substantial quantity of ammonium sulfate crystals can, however, result in obstruction of the flue gas flow, as explained earlier. To remedy this potential drawback, the first heat exchanger is further provided with water sprays 58 that periodically discharge a flood of cold water to wash off any of the ammonium sulfate byproduct that may have collected on the tubes 48 of the first heat exchanger 26.

It is preferable to collect the ammonium sulfate byproduct in its solid form, because it is most readily marketable in that state. In order to maximize the amount of byproducts that are collected in that preferred state, the invention provides separate collecting means for the dry precipitate and for the solution that is produced when the heat exchanger tubes are periodically washed. A sump 60 is provided directly below the first heat exchanger 26 to collect the solution or slurry 34 that is formed during the washing step. This slurry will contain crystals of the desired ammonium sulfate byproduct. An outlet 62 is provided at the bottom of the sump, and from there the byproduct can be led to storage or shipment containers. A set of bunched screens 64 may be provided in the sump across the flue gas flow to catch droplets of moisture.

The dry ammonium precipitate will be swept past the solution sump by the flue gas flow. Collection of the dry precipitate is performed by an electrostatic precipitator 66 located immediately after the solution sump 60. Electrostatic precipitators are known in the art for the removal of particulates from flue gas. According to the present invention, a trough 68 is provided below the precipitator for gathering the collected byproduct. The trough has an outlet 70 for passing the byproduct to storage, shipment, or processing. In this regard, one available alternative is to feed the dry precipitate to pelletization units for producing pellets of the byproduct. Such pellets have been used for decades in the fertilization of crops by airplane crop dusting.

After passing through the electrostatic precipitator 66, the flue gas enters a second heat exchanger 72. As in the first heat exchanger, a multiplicity of tubes 74 are disposed across the flue gas flow and carry boiler feed water. Preferably the feed water enters an inlet 76 of the second heat exchanger at its lowest temperature. The feed water exits at an outlet 78 of the second heat exchanger and is then piped to the inlet 50 of the first heat exchanger. Thus, the same stream of feed water is employed to effect cooling in both heat exchangers, with the lower temperature cooling in the second heat exchanger being carried out first along the flow of feed water.

The temperature of the feed water will ordinarily be subject to seasonal variations, and its capacity to cool the flue gas will be affected accordingly. Flue gas will exit the electrostatic precipitator at a temperature of about 230° F. to 200° F., and will be cooled in the second heat exchanger to about 100° F. to 80° F. in summer months, or 58° F to 40° F. in winter months. This cooling causes condensation of a large amount of water, since flue gas typically comprises 8% humidity. The resultant deluge of water in the second heat exchanger is collected in a sump 80, similar to the solution sump 60 of the first heat exchanger 26.

The water collected in the second heat exchanger sump 80 is substantially detoxified and can be safely discharged through an outlet 82 as waste water from the facility. A set of bunched screens 84 is again provided to catch droplets of moisture before the flue gas exits the sump 80. The flue gas then leaves the second heat exchanger 72 via an exit duct 86, by which it is led to a short exhaust stack as described earlier.

An additional feature of this invention is its capacity for the removal of not only oxides of sulfur, but also oxides of nitrogen. Nitric oxide (NO) is formed at high temperatures in the boiler, and is troublesome when released into the atmosphere because it oxidizes to nitrogen dioxide ($NO_2$). According to the present invention, nitric oxide is removed as ammonium nitrite by the addition of oxygenated ammonium hydroxide at low temperatures in the second heat exchanger. The ammonium hydroxide must be maintained at a low temperature in order to keep oxygen dissolved in it. The reaction proceeds as follows:

$$O_2 + 4NO + 4NH_4OH \rightarrow 4NH_4NO_2 \rightarrow 2H_2O$$

Ammonium nitrite then decomposes according to the reaction: $NH_4NO_2 \rightarrow N_2 2H_2O$. Precisely the amount of $NH_4OH$ needed to make $NH_4NO_2$ and cause the decomposition reaction is introduced to the second heat exchanger. The foregoing process is based upon the fact that nitrogen is the only element besides gold that gives off heat when it is deoxidized. According to Van Nostrand's Scientific Encyclopedia 1678 (3rd ed. 1958), the heat of formation of NO gas is −22 calories per 16 grams of oxygen. Since the heat of oxidation of hydrogen to $H_2O$ gas is 58 calories per 16 grams of oxygen, the result is 36 calories per 16 grams of oxygen. This amount is insignificant because flue gases contain a few hundred parts per million of NO.

This procedure is provided for by the apparatus shown in FIG. 2, which comprises inlets 88 for the introduction of ammonium hydroxide to the second heat exchanger 72. No additional modification of the equipment is necessary because the end products of the reactions are $N_2$ gas, which can be released to the atmosphere, and water, which is collected with the rest of the condensate in the sump 80.

In the event that less than all nitric oxide is removed by the foregoing process, the condensate from the second heat exchanger 72 can be recirculated from the sump 80 to additional inlets 90 at the top of the second heat exchanger. This recirculation effects a more rapid and complete cooling of the flue gas. Vacuum cooling could also be employed, if necessary, during summer weather when the condensate will be warmer. The important consideration is that the dissolution and decomposition of nitrogen compounds according to the above reactions will be more complete at lower temperatures because of the fact that nitrogen gives off heat when it is deoxidized.

As a specific example, a boiler fired at 1,658 lbs. coal/min. produces, at 86° F., 1,184 lbs. of condensate water from 21,416 lbs. flue gas/min. According to the Chemical Rubber Handbook Of Chemistry And Physics 1707 (43rd ed. 1961), the condensate water would dissolve $0.005165 \times 1184 = 6.1$ lbs NO/min., which amounts to $6.1/21,416 = 0.000285 = 285$ ppm NO/min. Recirculating twice the weight of water as shown above would eliminate $2 \times 285 = 570$ ppm NO. It should not be necessary to recirculate the condensate, however, because of the intense mixing of flue gas with the water of condensation and ammonium hydroxide. The equation $NH_4NO_2 \rightarrow N_2 + 2H_2O$ is not reversible. The nitrogen and water formed will not recombine to make ammonium nitrite. That decomposition process is explained in F. Ephraim, *Inorganic Chemistry* 178, 694 (4th ed. 1943). The present invention thus provides for substantially complete removal of oxides of both sulphur and nitrogen, while producing useful and/or harmless byproducts.

Figure 3:
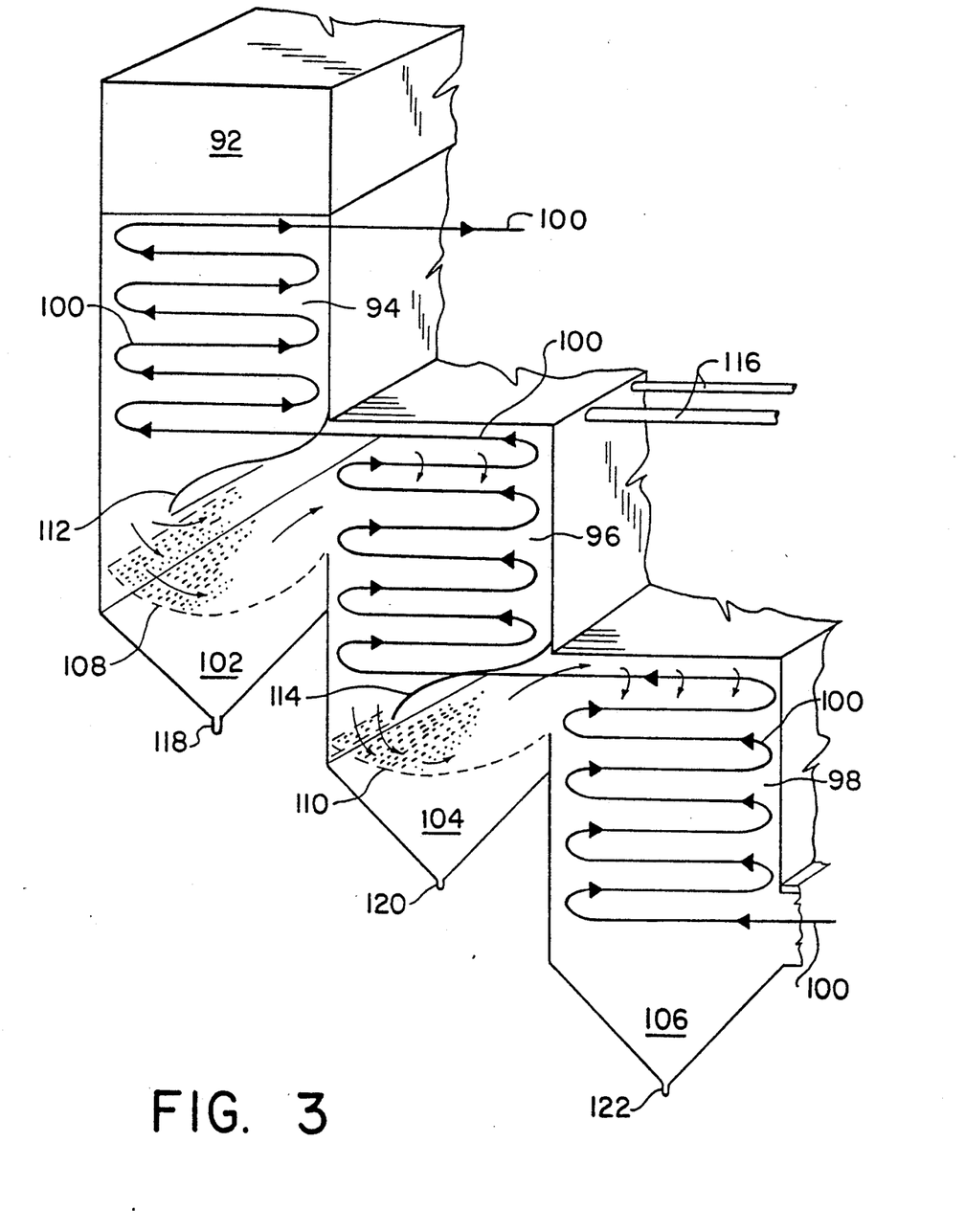
FIG. 3 is a cross-sectional view of an alternative embodiment of the invention, in which sulfuric acid and ammonium bisulfite and bisulfate are made.

Another embodiment of the present heat exchange and pollutant removal invention is shown in FIG. 3. The principal differences between this embodiment and the previously described embodiment are in the stage at which the ammoniacal substance is added, and the nature of the byproducts produced at each heat exchange section. Basically, the embodiment of FIG. 3 forms and collects pure sulfuric acid in a first heat exchange section, a concentrated solution of ammonium bisulfite or bisulfate in a second heat exchange section, and condensed water in a third heat exchange section.

According to this embodiment, the flue gas is first cleaned of large particulate matter such as fly ash before entering the heat exchanger sections. Thus, a bag house, electrostatic precipitator, or other satisfactory particulate removal means is located at a section 92 ahead of a first heat exchanger section 94. As stated earlier, removal of particulate pollutants such as fly ash prior to the heat exchange steps greatly enhances the effectiveness of pollutant removal in the heat exchange steps. Removal of pollutants in the first heat exchange step is by condensation, with $SO_3$ combining with $H_2O$ and condensing as $H_2SO_4$. Much of the sulphur oxide pollutants in flue gas, however, are in the form of $SO_2$ and not $SO_3$. These are removed by ammoniacal oxidation and combination, and the collection of byproducts. Removing fly ash and other particulates ahead of the ammoniacal reactions increases the efficiency of those reactions and of the sulfur removal process.

As shown in FIG. 3, there are three stages of heat exchange following removal of particulate pollutants. In the first heat exchanger section 94, flue gas is cooled from an entrance temperature of about 500° F. down to about 260°-290° F. A second heat exchanger section 96 cools the gas from about 260°-290° F. down to about 190°-200° F. The third heat exchanger section 98 cools the gas to a final temperature of about 40°-100° F. Tubes 100 carry the cooling fluid through the three sections.

By cooling the flue gas to about 260°-290° F., the first heat exchanger section 94 condenses a substantially undiluted sulfuric acid (water does not condense until around 212° F.). This acid is collected at a sump 102, which is made of an acid-resistant construction.

Substantially all remaining oxides of sulphur and nitrogen are removed in the second heat exchanger section 96. This requires the aforementioned oxidation of $SO_2$ to $SO_3$. Accordingly, ammonium hydroxide is introduced to the second section 96 in an amount sufficient to carry out the desired oxidation. The overall reaction in the second heat exchanger section was set forth earlier.

The importance of providing for the removal of particulates prior to heat exchange is once again apparent. A system relying on chemical combinations to remove sulphur and nitrogen oxides requires oxidation to effect complete purification of flue gas. The present invention recognizes, however, that oxidation is retarded by compounds in flue gas particulates such as fly ash, and that removal of the particulates is important to prevent such a "negative catalyst" effect.

Returning to the structure disclosed in FIG. 3, the oxidation step occurs at the beginning of the second heat exchange section 96. Consequently, it would suffice for the fly ash removal to be carried out at any point prior to the second section. As shown, the preferred embodiment removes fly ash ahead of the first heat exchange section 94.

The condensate produced in second section 96 is collected in sump 104. This condensate will contain crystals of ammonium sulphate $((NH_4)_2SO_4)$, in accordance with the reaction set forth earlier. Ammonium sulphate is a valuable byproduct, useful in fertilizer applications. The temperature to which the flue gas is cooled in this section is selected so that just enough water condenses to produce a concentrated solution of ammonium sulphate crystals, easily yielding a marketable product.

Inclusion of the third heat exchanger section 98 in the present embodiment is preferred but not absolutely necessary. This section is intended to remove any remaining trace amounts of sulphur or nitrogen oxides in the flue gas. These impurities are washed out of the gas with the condensing water. The condensate is collected at sump 106, and generally will contain pollutants in such small amounts that it can be disposed of by mixing with alkaline "blow-down" fluids from the boiler plant, or with fly ash sluiced into landfills. It may also be acceptable to dispose of this condensate in lakes or rivers, which almost invariably are slightly alkaline anyway.

The present invention further includes the use of slotted and curved stainless steel plates 108 and 110, located in sections 94 and 96, respectively. These plates are disposed toward the bottom of each section and serve to redirect the flue gas to the next section while separating the condensate from the gas. Separation is based on the use of centrifugal force exerted on the gas and condensate as they are conducted past the curved surfaces of plates Sulphuric molecules combined with water weigh approximately 80 lbs/ft$^3$, compared with 0.05 lbs/ft$^3$ for flue gas. This amounts to a weight ratio of 1600:1 which allows the condensate to separate from the flue gas by passing through the slots in plates 108, 110.

Curved plates 112, 114 in sections 94, 96, respectively, are provided to further assist in causing centrifugal separation of condensate from the flue gas. The speed of the flue gas flow is momentarily increased around the plates, which in turn raises the centrifugal force on the flow of flue gas and condensate. Plates 112, 114 are preferably made of an acid-proof stainless steel The use of slotted and curved plates as shown in FIG. 3 is not limited to the embodiment of that illustration, and could equally be used in the embodiment of FIG. 2, or indeed in any apparatus where separation of a condensate from a gas is desired.

It is noted that ammonia is fed to section 96 through a multiplicity of spray pipes 116. Valves 118, 120, 122 on sumps 102, 104, 106, respectively, continuously control and monitor the withdrawal of acids from the heat exchanger sections.

What is claimed is:

1. A method for removing $SO_2$ and $SO_3$ pollutants from boiler plant flue gas, comprising:
   exchanging heat between such flue gas and a first fluid through first heat exchanger tubes which carry the first fluid to cool the flue gas to a first temperature;
   introducing an ammoniacal substance into the flue gas before completion of the first temperature heat exchange step in an amount sufficient to combine with substantially all of the $SO_2$ and $SO_3$ in the flue gas to form dry crystals of ammonium sulfate, ammonium bisulfite or ammonium bisulfate adjacent and upon the first heat exchanger tubes;
   collecting the dry crystals;
   periodically washing the first heat exchanger tubes to remove crystals of ammonium sulfate, ammonium bisulfite or ammonium bisulfate therefrom;
   exchanging heat between such flue gas and a second fluid to cool the flue gas to a second temperature after the dry crystal collection step to condense water;
   collecting the water that condenses from the flue gas in the second temperature cooling step; and
   further cooling the flue gas by reintroducing into the flue gas at least a portion of the condensed water that was collected in the second temperature cooling step.

2. The method of claim 1, which further comprises collecting the solution formed by the washing step separately from the dry crystals which are collected when the washing step is not being performed.

3. The method of claim 2, wherein the dry crystals are collected by imparting an electrical charge to the crystals and attracting the crystals to a grounded collection area.

4. The method of claim 1, which further comprises removing particulates including fly ash from the flue gas before the ammoniacal substance introducing step, to improve oxidation of $SO_2$ to $SO_3$ and to improve the purity of dry crystals collected.

5. The method of claim 1, wherein the flue gas also contains NO, and which further comprises the step of introducing an ammoniacal substance to the flue gas before completion of the second temperature heat exchange step in an amount sufficient to combine with NO and form $NH_4NO_2$.

6. A method for removing $SO_2$ and $SO_3$ pollutants from boiler plant flue gas, comprising:
   exchanging heat between such flue gas and a first fluid through first heat exchanger tubes which carry the first fluid to cool the flue gas to a first temperature;
   introducing an ammoniacal substance into the flue gas before the first temperature heat exchange step in an amount sufficient to combine with substantially all of the $SO_2$ and $SO_3$ in the flue gas to form dry crystals of ammonium sulfate, ammonium bisulfite or ammonium bisulfate adjacent and upon the first heat exchanger tubes;
   collecting the dry crystals;
   removing particulates including fly ash from the flue gas before the ammoniacal substance introducing step to improve the oxidation of $SO_2$ to $SO_3$ and to improve the purity of the dry crystals collected;
   periodically washing the first heat exchanger tubes to remove crystals of ammonium sulfate, ammonium bisulfite or ammonium bisulfate therefrom;
   collecting the solution formed by the washing step separately from the dry crystals which are collected when he washing step is not performed;
   exchanging heat between such flue gas and a second fluid to cool the flue gas to a second temperature after the dry crystal collection step to condense water;
   collecting the water that condenses from the flue gas in the second temperature cooling step; and
   further cooling the flue gas by reintroducing into the flue gas at least a portion of the condensed water that was collected in the second temperature cooling step.

7. The method of claim 6, wherein the flue gas also contains NO, and which further comprises introducing an ammoniacal substance to the flue gas before completion of the second temperature heat exchange step in an amount sufficient to combine with NO and form $NH_4NO_2$.

8. A method for removing $SO_2$ and $SO_3$ pollutants from boiler plant flue gas, comprising:
   forming a first condensate by exchanging heat between such flue gas and a first fluid to cool the flue gas to a first temperature below the condensation point of sulfuric acid but above the condensation point of water so that substantially all $SO_3$ in the flue gas combines with $H_2O$ and condenses as sulfuric acid;
   collecting the first condensate;
   introducing an ammoniacal substance into the flue gas after the first temperature heat exchange step in an amount sufficient to oxidize at least a portion of the $SO_2$ in the flue gas to $SO_3$;
   forming a second condensate by exchanging heat between the flue gas and a second fluid, after the first temperature heat exchange step and the ammoniacal substance introduction step, to further cool the flue gas to a second temperature and to condense $SO_2$, $SO_3$, $H_2O$ and $NH_4OH$ from the flue gas as a second condensate;
   collecting the second condensate;

removing particulates including fly ash from the flue gas before the ammoniacal substance introducing step to improve the oxidation of $SO_2$ to $SO_3$; and further cooling the flue gas by reintroducing into the flue gas at least a portion of the second condensate that was collected.

9. The method of claim 8, which further comprises exchanging heat between the flue gas and a third fluid, to cool the flue gas to a third temperature, after the second temperature heat exchange step, to condense $H_2O$ with any remaining $SO_2$ and $SO_3$ in the flue gas as a third condensate; and collecting the third condensate.

10. The method of claim 8, which further comprises forming crystals of ammonium sulfate or ammonium bisulfate during the second temperature heat exchange step and collecting the dry crystals thus formed.

11. The method of claim 8 wherein the ammoniacal substance comprises ammonia or ammonium hydroxide.

* * * * *